US009431858B2

(12) United States Patent
Muñiz Casais

(10) Patent No.: US 9,431,858 B2
(45) Date of Patent: Aug. 30, 2016

(54) GENERATOR ROTOR AND METHOD OF ASSEMBLING

(75) Inventor: César Muñiz Casais, Barcelona (ES)

(73) Assignee: ALSTOM RENOVABLES ESPAÑA, S.L., Barcelona (ES)

( * ) Notice: Subject to any disclaimer, the term of this patent is extended or adjusted under 35 U.S.C. 154(b) by 253 days.

(21) Appl. No.: 14/115,855

(22) PCT Filed: May 17, 2012

(86) PCT No.: PCT/EP2012/059217
§ 371 (c)(1),
(2), (4) Date: Nov. 5, 2013

(87) PCT Pub. No.: WO2012/159973
PCT Pub. Date: Nov. 29, 2012

(65) Prior Publication Data
US 2014/0132004 A1    May 15, 2014

(30) Foreign Application Priority Data
May 20, 2011    (EP) .................................. 11382161

(51) Int. Cl.
*H02K 21/12*  (2006.01)
*H02K 5/00*   (2006.01)
(Continued)

(52) U.S. Cl.
CPC ................ *H02K 1/27* (2013.01); *F03D 9/002* (2013.01); *H02K 1/278* (2013.01); *H02K 1/2786* (2013.01);
(Continued)

(58) Field of Classification Search
CPC ...... H02K 1/27; H02K 1/278; H02K 1/2786; H02K 1/30; H02K 15/03; H02K 7/1838; H02K 2213/12; F03D 9/002; Y10T 29/49012

USPC .......... 310/156.01–156.84, 265–271, 261.1, 310/154.03, 154.72, 422, 427, 216.113, 310/216.129, 216.136, 216.003, 216.057; 290/55; 29/598
See application file for complete search history.

(56) References Cited

U.S. PATENT DOCUMENTS 1,808,568 A * 6/1931 Page ........................ H02K 1/30
310/422
(Continued)

FOREIGN PATENT DOCUMENTS

DE   10 2005 042543     3/2007
DE   102005042543   *  3/2007 ........... H02K 1/2766
(Continued)

OTHER PUBLICATIONS

English translation for DE 102005042543.*
(Continued)

*Primary Examiner* — Terrance Kenerly
*Assistant Examiner* — Ahmed Elnakib
(74) *Attorney, Agent, or Firm* — Squire Patton Boggs (US) LLP

(57) ABSTRACT

Generator rotor comprising a rotor rim and a plurality of permanent magnet modules arranged at one of an inner and outer circumference of said rotor rim, wherein the rotor rim comprises a plurality of rotor rings separated by gaps between them, and attached to each other via a plurality of axial strips fixed to the other of the inner and outer, the permanent magnet modules comprise a base and one or more rows of magnets mounted on a top surface of said base, and wherein the permanent magnet modules are fixed to the strips by a plurality of fasteners extending through the gaps between the rotor rings.

11 Claims, 3 Drawing Sheets

(51) Int. Cl.
    *H02K 1/22* (2006.01)
    *H02K 15/02* (2006.01)
    *F02D 9/00* (2006.01)
    *H02K 1/27* (2006.01)
    *H02K 1/30* (2006.01)
    *F03D 9/00* (2016.01)
    *H02K 15/03* (2006.01)
    *H02K 7/18* (2006.01)

(52) U.S. Cl.
    CPC ............... *H02K 1/30* (2013.01); *H02K 15/03* (2013.01); *H02K 7/1838* (2013.01); *H02K 2213/12* (2013.01); *Y02E 10/725* (2013.01); *Y10T 29/49012* (2015.01)

(56) References Cited

U.S. PATENT DOCUMENTS

| | | | | |
|---|---|---|---|---|
| 2,994,793 | A * | 8/1961 | Sills | H02K 1/28 310/157 |
| 4,110,652 | A * | 8/1978 | McGahern | H02K 1/30 310/422 |
| 5,023,501 | A * | 6/1991 | Zimmermann | H02K 1/185 29/596 |
| 5,111,094 | A * | 5/1992 | Patel | H02K 1/278 29/598 |
| 6,359,359 | B1 * | 3/2002 | Miura | H02K 1/276 310/156.08 |
| 6,710,502 | B2 * | 3/2004 | Maslov | H02K 21/22 310/112 |
| 8,552,614 | B2 * | 10/2013 | Altea | H02K 1/185 310/216.118 |
| 2006/0220483 | A1 * | 10/2006 | Jones | H02K 1/278 310/156.19 |
| 2008/0042514 | A1 * | 2/2008 | Cook | H02K 1/187 310/216.051 |
| 2009/0302702 | A1 * | 12/2009 | Pabst | H02K 1/2773 310/156.12 |
| 2011/0043065 | A1 | 2/2011 | Piercey et al. | |
| 2011/0248592 | A1 * | 10/2011 | Siegfriedsen | H02K 1/2753 310/156.08 |
| 2011/0298330 | A1 * | 12/2011 | Joeckel | F03D 9/002 310/216.008 |

FOREIGN PATENT DOCUMENTS

| | | | |
|---|---|---|---|
| DE | 102008063045 | * | 7/2010 |
| EP | 2028744 | * | 2/2009 |
| GB | 322829 | * | 12/1929 |
| GB | 1114413 | * | 5/1968 |
| GB | 2511574 | * | 9/2014 |
| JP | 06-3157632 | * | 6/1988 |
| WO | WO 2009/068736 | | 6/2009 |

OTHER PUBLICATIONS

English abstract for JP 06-3157632.*
English translation of DE 102005042543; Mar. 2007—Germany; Manfred et al.*
International Search Report and Written Opinion for PCT/EP2012/059217, mailed Jun. 25, 2013, 12 pgs.

* cited by examiner

GENERATOR ROTOR AND METHOD OF ASSEMBLING

The present invention relates to a generator rotor, and more particularly relates to a generator rotor that is especially suitable for a wind turbine. The present invention further relates to a method for assembly of a generator rotor.

BACKGROUND ART

Generators having a rotor carrying permanent magnets are known. They are generally deemed to be reliable and require less maintenance than other generator topologies.

Modern wind turbines are commonly used to supply electricity into the electrical grid. Wind turbines of this kind generally comprise a rotor with a rotor hub and a plurality of blades. The rotor is set into rotation under the influence of the wind on the blades. The rotation of the rotor shaft either directly drives the generator rotor ("directly driven") or through the use of a gearbox. For offshore wind turbines, direct drive systems employing permanent magnets are usually chosen.

Such a direct drive wind turbine generator may have e.g. a diameter of 6-8 meters and a length of e.g. 2-3 meters. Hundreds of magnets may need to be screwed or glued to the circumference of the rotor. It will be clear that this manufacturing process can be cumbersome.

Furthermore, if one or more magnets is damaged and needs to be replaced, the access to these magnets can be complicated (especially with large size generators), such that maintenance can become very expensive.

This size and type of generator is not limited to the technical field of wind turbines only. Generators of considerable dimensions may also be found e.g. in steam turbines and water turbines.

SUMMARY OF THE INVENTION

In a first aspect, the present invention provides a generator rotor comprising a rotor rim and a plurality of permanent magnet modules arranged at an outer or inner circumference of said rotor rim. The rotor rim comprises a plurality of rotor rings separated by gaps between them, and attached to each other via a plurality of axial strips fixed to an opposite circumference of the ring. The permanent magnet modules comprise a base and one or more rows of magnets mounted on a top surface of said base, and the permanent magnet modules are fixed to the strips by a plurality of fasteners extending through the gaps between the rotor rings.

In this aspect of the invention, a generator rotor is provided that can be assembled relatively easily. The permanent magnets do not need to be attached one by one and there is no need to perforate the rotor rim.

In case that the stator is arranged around the rotor with permanent magnets, the permanent magnet modules will be positioned on an outer circumference of the rotor rim. The axial strips that connect the plurality of rotor rings will thus be attached at the inner circumference of the rotor rim. In case the rotor is arranged around the stator, the permanent magnet modules will be positioned on the inner circumference of the rotor rim (and the axial strips on the outer circumference).

In some embodiments, the permanent magnet modules may comprise a single row of magnets. In other embodiments, the permanent magnet module may comprise at least two rows of magnets.

In some embodiments, the fasteners are fixed in blind holes in the base of the permanent magnet module. No holes need to be provided in the permanent magnet material which may be more cost-effective.

In some embodiments, the axial strips may be fixed to the bottom of the rings by welding. In alternative embodiments, the strips may be attached to the inner circumference of the rings by gluing, riveting, bolts or otherwise.

In some embodiments, the permanent magnets may be covered with a non-magnetic material, such as a resin or stainless steel. A cover may serve to protect the magnets against corrosion, but a cover may also induce parasitic currents and/or decrease thermal dissipation.

In some embodiments, the permanent magnet modules may have a length substantially corresponding to half of the length of the generator. Two permanent magnet modules may be arranged behind each other. In other embodiments, the permanent magnet modules may have a length corresponding substantially to the length of the generator. In yet further embodiments, the permanent magnet modules may have a length substantially corresponding to another fraction of the length of the generator. Also, in some embodiments, the axial strips may have the length of the generator. In other embodiments, the axial strips may have a fraction (e.g. half) of the length of the generator.

In another aspect, the invention provides a method of assembling comprising providing a plurality of rotor rings, providing a plurality of strips, and attaching the rotor rings to the plates by welding at one of an inner or outer circumference of the rotor rings, and leaving gaps between the rotor rings, positioning a permanent magnet module on the other of the inner or outer circumference of the rotor rings, and attaching the module to the plates with a plurality of bolts, the bolts extending in the gaps between the rotor rings.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS

Figure 1A:
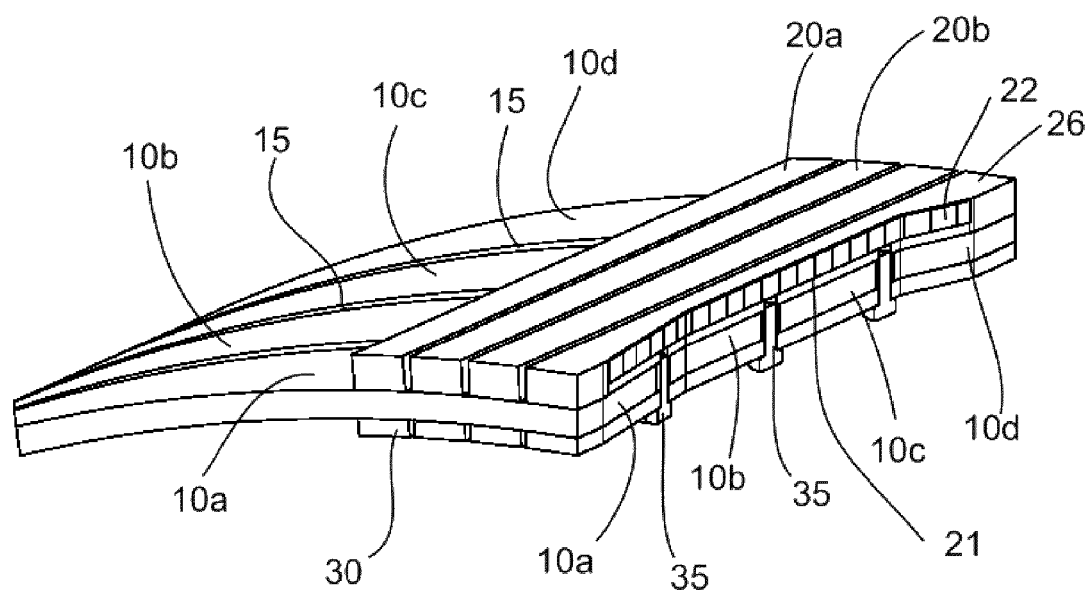
FIGS. 1a-1c illustrate a first embodiment of a generator rotor according to the present invention.

FIG. 1a illustrates a rotor rim formed by the outer circumference of a plurality of rotor rings 10a, 10b, 10c and 10d. The rings are attached to each other by a plurality of strips 30 that extend axially from the front ring 10a to the rear ring 10d.

Gaps 15 are maintained between neighbouring rotor rings 10. A plurality of permanent magnet modules 20 are provided on the outer circumference of the rotor rim. In this embodiment, each permanent magnet module comprises a base 21 upon which a single row of magnets 22 is arranged.

The permanent magnets may be covered with a thin plate of stainless steel and/or by e.g. an epoxy resin 26. In alternative embodiments, the permanent magnets may not be covered at all. These embodiments may provide good cooling of the magnets, using the free space between them. With a cover, the permanent magnets may be more protected from their environment and it may e.g. reduce the likelihood and degree of corrosion. However, a cover may decrease thermal dissipation and may also cause parasitic currents in the cover. For this reason, generally non-magnetic materials may be used.

In this example, a plurality of bolts 35 extend through holes in the strips 30 into the base 21 of the permanent magnet modules. This way, the permanent magnets are securely fixed to the outer circumference of the rotor rim without having to fix every single magnet separately. Additionally, if blind holes in the base of the permanent magnet modules are used, none of the permanent magnets needs to be machined with e.g. a bolt hole.

In this aspect of the invention, a generator rotor is thus provided that can be assembled relatively easily. The permanent magnets do not need to be attached one by one and there is no need to perforate the rotor rim.

In the example of FIG. 1a, each permanent magnet module carries a single row of permanent magnets. In alternative embodiments, on the top surface of the base, multiple rows of permanent magnets may be provided. The width of the permanent magnet modules and the number of rows of magnets may be varied. Having a higher number of magnets per module reduces the number of modules and may simplify the assembly procedure. On the other hand, smaller modules may be more easily manufactured.

Figure 1B:
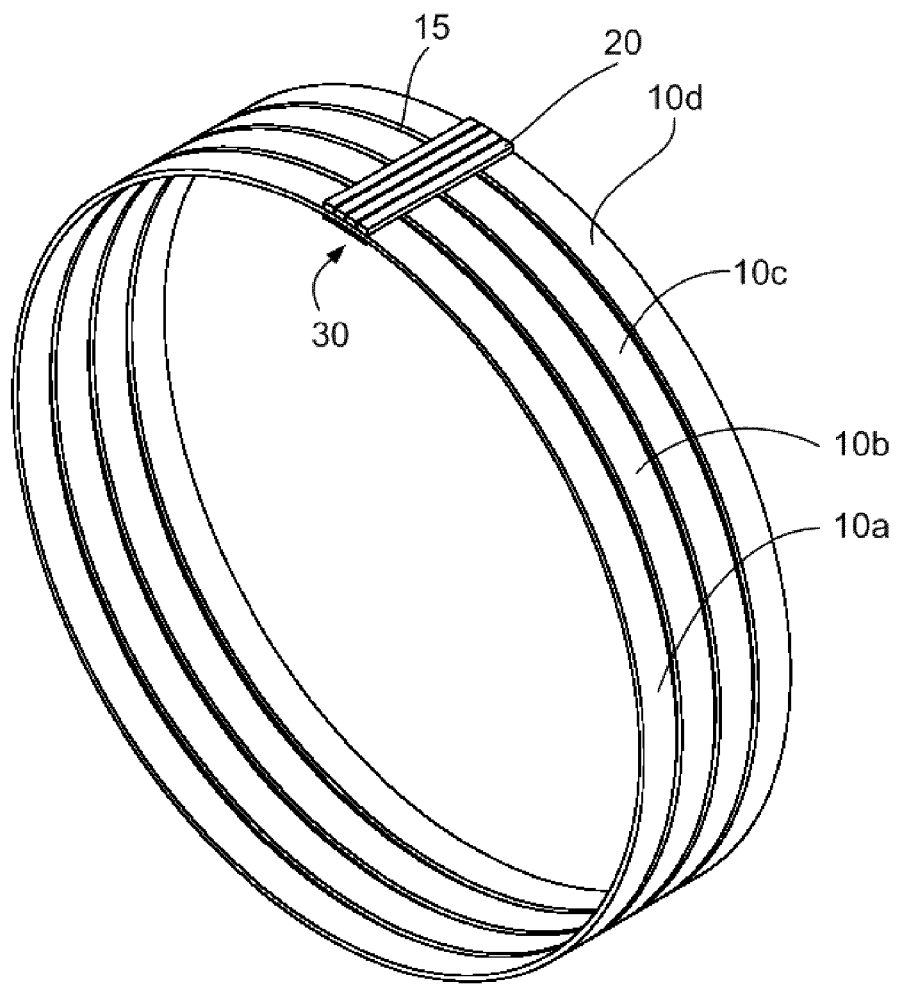
Figure 1C:
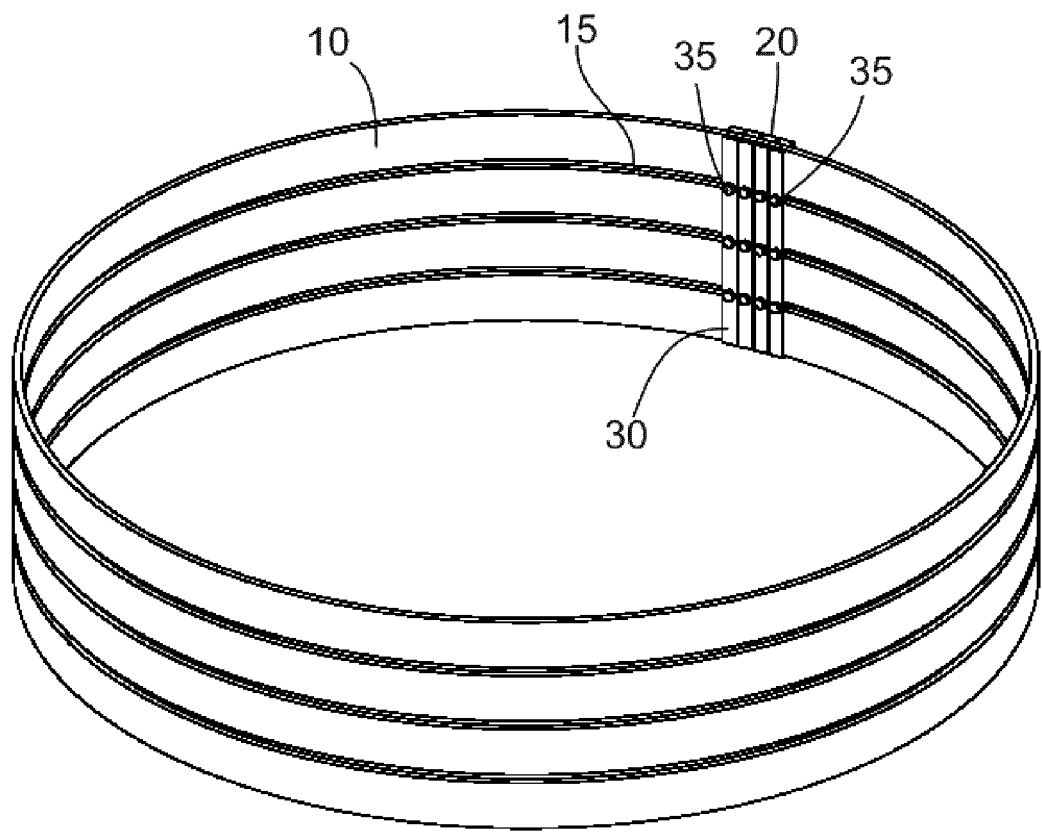

FIGS. 1b and 1c show two different views of the same embodiment.

It will be clear that e.g. the number of rotor rings may be varied in accordance with circumstances. Additionally, it will be clear that the width of the strips does not necessarily need to be the same as the width of the permanent magnet modules.

In general, if the strips are sufficiently narrow, they may be straight, i.e. do not need to be curved to adapt to the form of the rotor rim.

Not shown in FIGS. 1a and 1b is the central rotor structure, supporting the rotor rim 10. Such a rotor structure may take many suitable forms and may comprise e.g. a hub with a plurality of radially and optionally axially extending spokes supporting the rotor rim, or a more solid rotor comprising e.g. a relatively thick annular structure. Within the scope of the present invention, any central rotor structure supporting the plurality of rings that from the rotor rim may be used.

Similarly, in configurations wherein the rotor is arranged surrounding the stator, the support structure around the rotor rim may also take any suitable form.

Since the permanent magnet module are fixed to the rotor rim through their base, friction between fasteners and permanent magnets can substantially be avoided in embodiments of the invention, both in operation and during assembly.

Figure 2A:
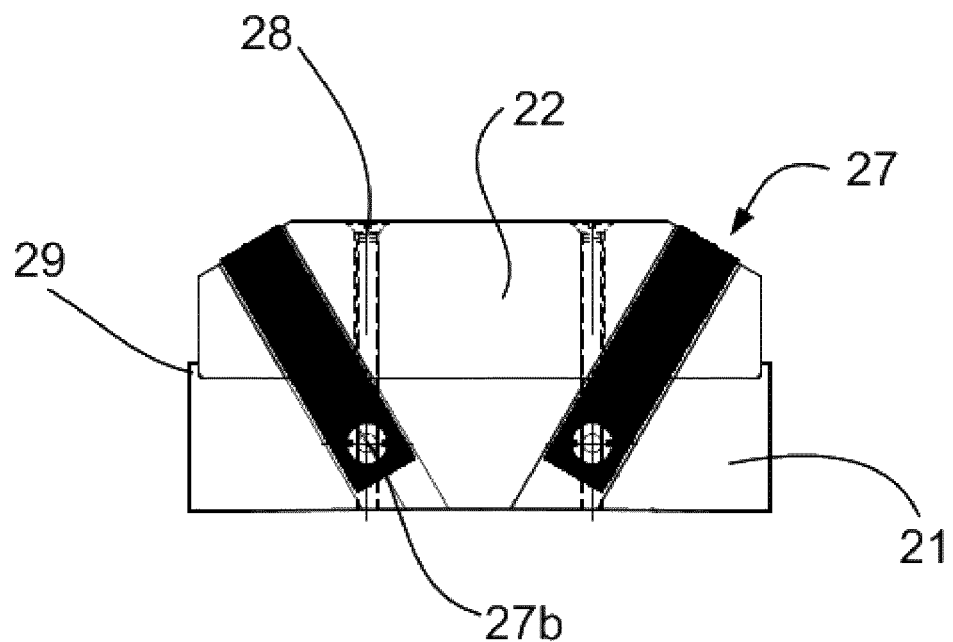
FIGS. 2a and 2b illustrate a front view and a cross-sectional view of an example of a permanent magnet module that may be used in embodiments of the present invention.

FIG. 2a illustrates a front view of a permanent magnet module in accordance with an embodiment of the present invention. The permanent magnet modules comprise a base 21 and a row of permanent magnets 22. In this embodiment, the permanent magnets 22 may be mounted on the base 21 using sets of screws 28. Additionally, the magnets may be glued to the base. Furthermore, belts 27 are attached at a front of the module, extend on top of the permanent magnets towards the rear and are attached at a rear of the module (see also FIG. 2b) to thereby bind the permanent magnets to the base. In alternative embodiments, only one or two of these ways to fix the magnet on the base may be used: in a specific example, the magnets may be glued to the base and the belts are merely provided for if and when the glue degrades during the lifetime of the generator. In another example, the magnets may be glued to the base without any additional fastening mechanism. Friction between magnets and fasteners may thus be avoided.

To more easily and precisely position a magnet on top of the base, the top surface of the base may comprise two upstanding guides 29 between which magnets can be placed.

Figure 2B:
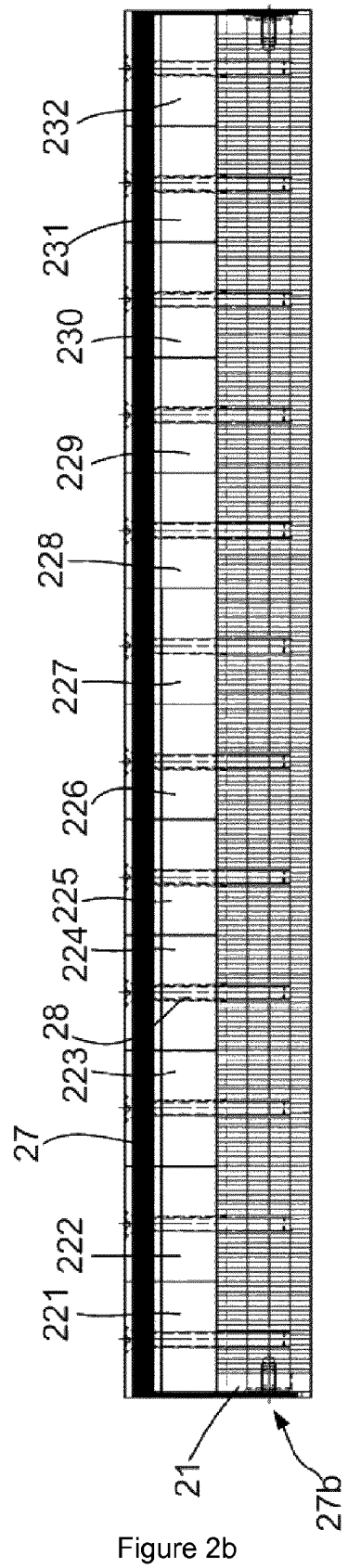

FIG. 2b illustrates a row of magnets 221-232 as seen in an axial cross-section. Belts 27 may be fixed with a pin (or other fastener) 27b at the front and at the rear of the permanent magnet module.

The permanent magnet modules may have a length that substantially corresponds to the axial length of the generator; each permanent magnet module thus spans substantially the entire length of the generator. In other embodiments, the length of a module may be substantially half of the axial length of the generator; two permanent magnet modules span the length of the generator. In these cases, one module may be inserted from the front and one module may be inserted from the rear during e.g. maintenance. In further embodiments, the length of a module may be substantially equal to another fraction of the length of the generator.

Similarly, the axial strips do not necessarily span the entire length of the generator. Instead in some embodiments, a number of axial strips are positioned behind each other to together span the length of the generator.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A generator rotor, comprising:
a cylindrical rotor rim,
a support structure supporting the cylindrical rotor rim, and
a plurality of permanent magnet modules, wherein
the cylindrical rotor rim is formed by a plurality of rotor rings axially arranged one behind the other and separated by gaps between them, the rotor rings being attached to each other via a plurality of axial strips fixed to one of an inner and outer circumference of the rings,
the permanent magnet modules comprise a base and one or more rows of magnets mounted on a top surface of the base, and arranged at the other of the inner and outer circumference of the rings, and wherein
the permanent magnet modules are secured to the rotor rings by a plurality of fasteners extending through the gaps between the rotor rings and connected to the axial strips.

2. The generator rotor according to claim 1, wherein each permanent magnet module comprises a single row of magnets.

3. The generator rotor according to claim 1, wherein each permanent magnet module comprises at least two rows of magnets.

4. The generator rotor according to claim 3, wherein the fasteners are bolts.

5. The generator rotor according to claim 1, wherein the fasteners are fixed in blind holes of the base of the permanent magnet modules.

6. The generator rotor according to claim 1, wherein the axial strips are fixed to the inner circumference of the rings by welding.

7. The generator rotor according to claim 1, wherein the magnets are covered with a non-magnetic material.

8. The generator rotor according to claim 1, wherein the permanent magnet modules have a length substantially corresponding to a length of the generator rotor.

9. The generator rotor according to claim 1, wherein the permanent magnet modules have a length substantially corresponding to half of a length of the generator rotor.

10. A direct drive wind turbine comprising a generator having a generator rotor according to claim 1.

11. A method of assembling the generator rotor according to claim 1, comprising:
providing a plurality of rotor rings;
providing a plurality of strips, and attaching the rotor rings to the strips by welding at one of an inner and outer circumference of the rotor rings including leaving gaps between the rotor rings when the strips are welded to the rotor rings;
positioning a permanent magnet module on the other of the inner and outer circumference of the rotor rings; and
attaching the permanent magnet module to the strips with a plurality of bolts, the bolts extending into the gaps between the rotor rings.

* * * * *